(12) United States Patent
Saeki et al.

(10) Patent No.: US 11,055,224 B2
(45) Date of Patent: Jul. 6, 2021

(54) DATA PROCESSING APPARATUS AND PREFETCH METHOD

(71) Applicant: HITACHI, LTD., Tokyo (JP)

(72) Inventors: Yuji Saeki, Tokyo (JP); Takashige Baba, Tokyo (JP)

(73) Assignee: HITACHI, LTD., Tokyo (JP)

( * ) Notice: Subject to any disclaimer, the term of this patent is extended or adjusted under 35 U.S.C. 154(b) by 51 days.

(21) Appl. No.: 16/294,092

(22) Filed: Mar. 6, 2019

(65) Prior Publication Data

US 2019/0361811 A1    Nov. 28, 2019

(30) Foreign Application Priority Data

May 24, 2018 (JP) .............................. JP2018-099700

(51) Int. Cl.
| | |
|---|---|
| *G06F 12/00* | (2006.01) |
| *G06F 12/0862* | (2016.01) |
| *G06N 3/08* | (2006.01) |
| *G06N 7/00* | (2006.01) |
| *G06F 12/0868* | (2016.01) |
| *G06F 12/02* | (2006.01) |
| *G06F 16/903* | (2019.01) |

(52) U.S. Cl.
CPC ...... *G06F 12/0862* (2013.01); *G06F 12/0868* (2013.01); *G06N 3/08* (2013.01); *G06N 7/00* (2013.01); *G06F 12/0246* (2013.01); *G06F 16/903* (2019.01)

(58) Field of Classification Search
None
See application file for complete search history.

(56) References Cited

U.S. PATENT DOCUMENTS

| | | | |
|---|---|---|---|
| 7,805,580 B2 | 9/2010 | Hirzel et al. | |
| 8,112,755 B2 | 2/2012 | Apacible et al. | |
| 8,140,746 B2 | 3/2012 | Trichina et al. | |
| 8,607,005 B2 | 12/2013 | Boyd et al. | |
| 9,298,633 B1 | 3/2016 | Zhao et al. | |
| 2016/0179544 A1* | 6/2016 | Heinecke | G06F 9/30047 |
| | | | 712/207 |
| 2016/0381176 A1 | 12/2016 | Cherubini et al. | |

* cited by examiner

*Primary Examiner* — Midys Rojas
(74) *Attorney, Agent, or Firm* — Volpe Koenig

(57) ABSTRACT

An area for prefetching is determined while accommodating an increase in a block address space. A prediction model predicts prefetch addresses for each of bit ranges into which block addresses are split by using a plurality of neural networks assuming charge of the different bit ranges having performed machine learning on I/O trace data, a prediction accuracy determination section determines a size of an area for prefetching on the basis of addresses in the bit range for which prediction accuracy in prefetch is lower than a predetermined value, a predicted value determination section determines addresses of the area for prefetching on the basis of addresses in the bit range for which the prediction accuracy in the prefetch is equal to or higher than the predetermined value, and a prefetch issuance section caches data in the area for prefetching in a storage class memory from a NAND flash memory.

12 Claims, 12 Drawing Sheets

FIG. 9

| ID | DB NAME | QUERY | LEARNING DATA VOLUME | PREDICTION ACCURACY | {SIMILAR QUERY | SIMILARITY | PERFORMANCE} | OPERATION |
|----|---------|-------|----------------------|---------------------|----------------|------------|--------------|-----------|
|    |         |       |                      |                     |                |            |              |           |
|    |         |       |                      |                     |                |            |              |           |
|    |         |       |                      |                     |                |            |              |           |
|    |         |       |                      |                     |                |            |              |           |
|    |         |       |                      |                     |                |            |              |           |
|    |         |       |                      |                     |                |            |              |           |

OPERATION:
- Prefetch: on/off
- Training: on/off
- Archive
- Branch
- Change score
- ...

89

DATA PROCESSING APPARATUS AND PREFETCH METHOD

BACKGROUND OF THE INVENTION

1. Field of the Invention

The present invention relates to a data processing apparatus and a prefetch method applicable to a storage class memory.

2. Description of the Related Art

A storage class memory is a new memory that fills a memory hierarchy gap in a computing machine, that is, a gap between a main storage device configured with a DRAM and a storage device configured with a NAND flash memory in access time, or more specifically a gap to the extent that the main storage device is approximately 1000 times shorter in access time than the storage device. For example, Intel and Micron released 3D XPoint Technology that is a mass-storage nonvolatile memory technology that enables the use of a mass-storage nonvolatile memory as a storage class memory. The technology can realize a nonvolatile memory having a life 1000 times longer than that of a NAND flash memory, faster than the NAND flash memory, having a capacity ten times larger than that of a DRAM, and accessible in bytes with the same interface as that for the DRAM.

A basic method of using the storage class memory in an information processing system is to use the storage class memory as a storage cache of a NAND flash memory, to store data with a high frequency in use and of a large scale so that the data cannot be stored in the DRAM, and to make it possible to use the storage class memory at relatively short access time. Well-known examples of using machine learning are present as means for determining data with a high frequency in use to be stored in the storage cache.

U.S. Pat. No. 8,607,005 describes an embodiment of learning data blocks accessed by specific software in a storage and prefetching the learned data blocks in response to a start of the software.

U.S. Pat. No. 7,805,580 describes an embodiment of determining an optimal data layout by repeating steps of measuring a performance while changing data layouts expanded in a main storage.

U.S. Pat. No. 8,112,755 describes an intelligent memory management method by an operating system for improving prediction accuracy using a plurality of prediction methods in determining data to be paged out for minimizing user perceived latencies.

US Patent Application Serial No. 2016/0381176 describes a method of fetching an application model containing data access patterns to a storage when an application accesses an initial file, identifying one or more files be accessed next, and prefetching the identified files.

U.S. Pat. No. 8,140,746 describes intelligent data management for prefetching a file in a main storage on the basis of embedded rules and metadata generated by an inference engine.

U.S. Pat. No. 9,298,633 describes a method of efficient data protection by monitoring input/output requests associated with storages and a storage cache, and predicting future write requests by application of a prefetch algorithm.

The memory hierarchy gap is present in access time to the effect that the NAND flash memory that is a memory element configuring a storage is approximately 1000 times longer in access time than the DRAM that configures a main storage. Owing to this, an in memory database that stores data to be analyzed in a main storage is used in analyzing large-scale data. However, it is necessary to use many computing machines for which a total main storage capacity exceeds a data size, resulting in cost increase of the system.

To address the problem, it is conceivable that the number of necessary computing machines is reduced by applying a storage class memory that fills the memory hierarchy gap to expand the main storage capacity. In a case of using the storage class memory for expansion of the main storage capacity, a program for processing data of a size equal to or larger than a conventional size on a main storage can be executed in computing machines in each of which one memory hierarchy having a large storage capacity is added to increase memory hierarchies with a DRAM used as a cache memory and in which hardware exercises conventional memory access control.

On the other hand, in a mechanism that swaps data overflowing from the storage class memory with data stored in a storage, an operating system basically performs writes and reads to and from the storage when a page fault interrupt occurs, and the mechanism requires overhead regardless of the storage class memory.

Therefore, a mechanism that retains data with a high access frequency is implemented in the in memory database to perform writes and reads for optimizing data placement; however, this involves increasing memory hierarchies and it is, therefore, necessary to greatly alter a data placement mechanism. Furthermore, it is more efficient to have a prefetch function from the storage at a platform level than to implement different mechanisms into databases to correspond to data storage formats.

In the well-known example of providing a function to perform machine learning on patterns of previous writes and reads to and from a storage and using the learned patterns in prefetch on the basis of a prediction result, predicting data to be accessed in the future in blocks requires a large amounts of data and powerful computing machine resources to cause neural networks having a complicated structure to learn the patterns since the storage has a huge block address space. Moreover, since the structure of optimum neural networks varies depending on an applied field, trials and errors including devising new models are necessary in the machine learning.

SUMMARY OF THE INVENTION

The present invention has been achieved in the light of the above circumstances, and an object of the present invention is to provide a data processing apparatus that can determine an area to be prefetched while accommodating an increase in a block address space.

To attain the object, a data processing apparatus according to a first aspect splits block addresses into bit ranges on the basis of bit positions, determines prediction accuracy of block addresses used in prefetch for each of the bit ranges, and determines an area to be prefetched on the basis of the prediction accuracy determined for each of the bit ranges.

According to the present invention, it is possible to determine an area to be prefetched while accommodating an increase in a block address space.

BRIEF DESCRIPTION OF THE DRAWINGS

FIG. 9 depicts an example of an MN management screen for managing the neural networks of FIG. 1;

DESCRIPTION OF THE PREFERRED EMBODIMENTS

Embodiments of the present invention will be described hereinafter with reference to the drawings. It is noted that embodiments described hereinafter are not intended to limit the invention set forth in claims, and that all of elements described in the embodiments and combinations thereof are not always essential to attaining the object of the invention.

First Embodiment

Figure 1:
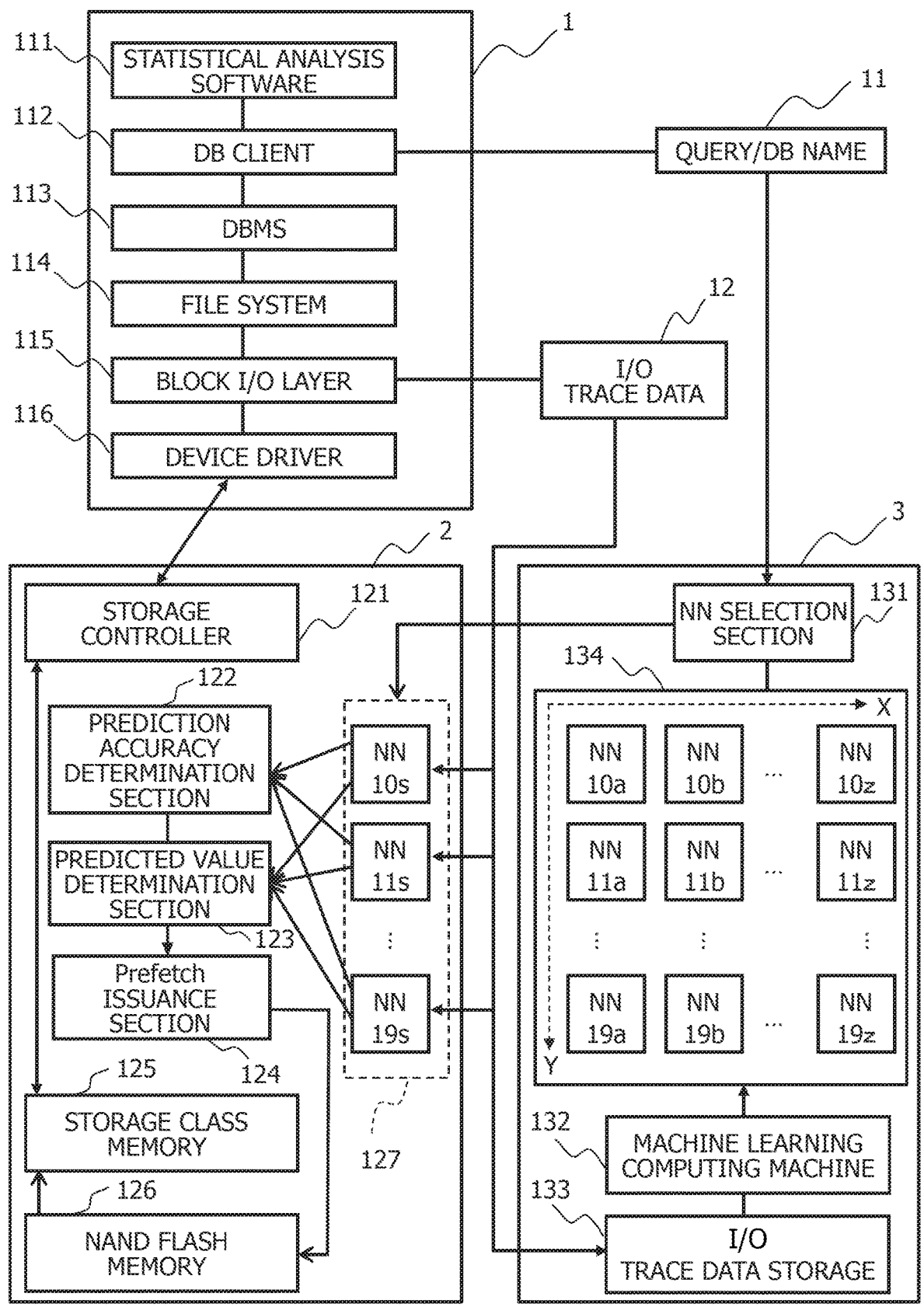
FIG. 1 is a block diagram depicting a configuration of a data processing apparatus according to a first embodiment.

FIG. 1 is a block diagram depicting a configuration of a data processing apparatus according to a first embodiment.

In FIG. 1, the data processing apparatus is configured with a data analysis server 1, a storage device 2, and a neural network management system 3. The data analysis server 1 analyzes large-scale data stored in the storage device 2. The neural network management system 3 manages neural networks 10a to 19a, 10b to 19b, . . . , and 10z to 19z that have been made to perform machine learning on I/O trace data 12 for each of bit ranges into which block addresses of a storage are split. Block addresses used in previous reads or writes are recorded in the I/O trace data 12.

The storage device 2 stores the large-scale data to be analyzed by the data analysis server 1. At this time, the storage device 2 can perform storage caching on data to be read or to be written. The storage device 2 herein splits block addresses into a plurality of bit ranges on the basis of bit positions, determines prediction accuracy of addresses used in prefetch for each of the bit ranges, and determines an area to be prefetched on the basis of the prediction accuracy determined for each of the bit ranges. The prediction accuracy in the prefetch can be indicated by a probability of caching data to be used in the future. For example, as the prediction accuracy in the prefetch, a probability that addresses in a bit range used in the prefetch matches addresses in a bit range used in reads or writes after the prefetch can be used. The bit ranges into which the block addresses are split may overlap partially.

The data analysis server 1 is configured with statistical analysis software 111, a DB (Database) client 112, a database management system 113, a file system 114, a block I/O layer 115, and a device driver 116.

The statistical analysis software 111 is a program used in analyzing the large-scale data. The DB client 112 receives queries, and transmits the queries to the database management system 113 via an interface corresponding to the database management system 113. The database management system 113 manages the data to be analyzed stored in the storage device 2. The file system 114 specifies block addresses indicating data storage positions and the number of blocks, and issues read or write requests. The block I/O layer 115 issues read or write requests to the device driver 116 corresponding to the storage device 2. The device driver 116 reads or writes data from or to the storage device 2 via the interface corresponding to the storage device 2.

The storage device 2 is configured with a storage controller 121, a prediction accuracy determination section 122, a predicted value determination section 123, a prefetch issuance section 124, a storage class memory 125, a NAND flash memory 126, and a prediction model 127.

The storage controller 121 exercises control over reads or writes from or to the storage class memory 125. The storage class memory 125 is a nonvolatile memory having a life 1000 times longer than that of the NAND flash memory 126, faster than the NAND flash memory 126, having a capacity ten times larger than that of a DRAM, and accessible in bytes with the same interface as that for the DRAM. The storage class memory 125 can be used as a storage cache of the NAND flash memory 126. As the storage class memory 125, for example, a magnetoresistive random access memory (PRAM), a resistance random access memory (ReRAM), a phase-change memory (PRAM/PCM), a ferroelectric random access memory (FeRAM), a spin transfer torque random access memory (STT-MRAM), a carbon nanotube memory, or a 3D XPoint memory can be used. The NAND flash memory 126 is a nonvolatile memory from or to which data can be read or written in pages and from which data can be erased in blocks.

The prediction model 127 predicts prefetch addresses for each of the bit ranges into which the block addresses are split. At this time, the prediction model 127 can use a plurality of neural networks $10s$ to $19s$ that have been made to perform machine learning on the I/O trace data 12 and that assume charge of the different bit ranges. The prediction accuracy determination section 122 determines a size of an area to be prefetched on the basis of addresses in the bit range in which the prediction accuracy in the prefetch is lower than a predetermined value. The predicted value determination section 123 determines addresses of the area to be prefetched on the basis of the addresses in the bit range in which the prediction accuracy in the prefetch is equal to or higher than the predetermined value. The prefetch issuance section 124 caches data about the area to be prefetched in the storage class memory 125 from the NAND flash memory 126.

The neural network management system 3 configured with a neural network selection section 131, a machine learning computing machine 132, an I/O trace data storage 133, and a neural network management area 134.

The neural network selection section 131 selects the neural networks 10s to 19s corresponding to a query and a database name 11 from among the neural networks 10a to 19a, 10b to 19b, . . . , and 10z to 19z so that the selected neural networks 10s to 19s can be used as the prediction model 127. The machine learning computing machine 132 causes the neural networks selected from among the neural networks 10a to 19a, 10b to 19b, . . . , and 10z to 19z to learn the I/O trace data 12 accompanying execution of the query for each of the bit ranges. The I/O trace data storage 133 saves the I/O trace data 12.

The neural network management area 134 is configured with the plurality of neural networks 10a to 19a, 10b to 19b, . . . , and 10z to 19z. The neural networks 10a to 19b, 10b to 19b, . . . , and 10z to 19z can be provided for the bit ranges into which the block addresses are split and for the queries and database names 11. At this time, the neural networks 10a to 19a, 10b to 19b, . . . , and 10z to 19z assuming charge of different queries and database names 11 can be arranged in an X-direction, while the neural networks 10a to 19a, 10b to 19b, . . . , and 10z to 19z assuming charge of different bit ranges can be arranged in a Y-direction.

Operations in a case of analyzing the large-scale data read from the storage device 2 to the data analysis server 1 using a prefetch method based on predictions by the neural networks 10s to 19s will be described hereinafter.

When the DB client 112 receives a query, the DB client 112 transmits the query to the database management system 113. The database management system 113 executes the query, and reads data corresponding to description of the query from a file on the file system 114. At this time, the statistical analysis software 111 runs to perform statistical analysis of the data acquired by executing the query.

Data is read or written from or to the storage device 2 in, for example, 512-byte blocks. At this time, the file system 114 specifies block addresses indicating data storage positions and the number of blocks and issues read requests to the block I/O layer 115. The block I/O layer 115 queues requests from the file system 114, merges together the requests to continuous blocks, and issues a read request to the device driver 116 corresponding to the storage device 2. The device driver 116 reads data from the storage device 2 via the interface corresponding to the storage device 2.

Furthermore, when receiving the query, the DB client 112 transmits the query to the database management system 113 and sends the received query and the database name 11 to the neural network management system 3.

The neural network management system 3 manages the neural networks 10a to 19a, 10b to 19b, . . . , and 10z to 19z corresponding to a plurality of queries and a plurality of database names 11. The neural network selection section 131 then selects the neural networks 10s to 19s corresponding to the received query and the database name 11, and sends a parameter group that define the neural networks 10s to 19s to the storage device 2. This parameter group can contain weights and biases of the neural networks 10s to 19s. Each of these selected neural networks 10s to 19s assumes charges of each of the bit ranges into which bits configuring the block addresses are split and predicts part of the block addresses. For example, block addresses [29:0] formed from 30 bits are split into seven bit ranges [29:24], [25:20], [21:16], [17:12], [13:8], [9:4], and [5:0] each of six bits containing overlapping bits, and the neural networks 10s to 19s assume charge of the respective bit ranges.

To predict the block addresses for each of the bit ranges, the data analysis server 1 acquires the I/O trace data 12 by monitoring an operation of the block I/O layer 115, and sends the acquired I/O trace data 12 to the storage device 2 and the neural network management system 3. The I/O trace data 12 can contain information such as time of issuance of read and write requests, the block addresses, and the number of blocks. The I/O trace data 12 is stored in the I/O trace data storage 133 for use in learning by the neural networks 10a to 19a, 10b to 19b, . . . , and 10z to 19z.

Furthermore, the data analysis server 1 sends the received query and database name 11 to the neural network management system 3. The machine learning computing machine 132 then causes the neural networks selected from among the neural networks 10a to 19a, 10b to 19b, . . . , and 10z to 19z to correspond to the query and the database name 11 to perform learning using the I/O trace data 12.

Each of the neural networks 10s to 19s selected to correspond to the query and the database name 11 can predict block addresses subjected to future reads or writes for each of the bit ranges.

Predicted values of the block addresses predicted by each of the neural networks 10s to 19s are output to the prediction accuracy determination section 122 and the predicted value determination section 123 for each of the bit ranges. The prediction accuracy determination section 122 then compares the predicted values of the block addresses with block addresses to be used in reads or writes after the prediction for each of the bit ranges, thereby determining prediction accuracy of the predicted values of the block addresses.

The prediction accuracy determination section 122 then determines a size of an area to be prefetched on the basis of the addresses in the bit range low in prediction accuracy. Furthermore, the predicted value determination section 123 determines addresses of the area to be prefetched on the basis of the addresses in the bit range high in prediction accuracy. The prefetch issuance section 124 caches data specified by the addresses determined by the predicted value determination section 123 in the storage class memory 125 from the NAND flash memory 126 by as much as the size determined by the prediction accuracy determination section 122.

Here, determining the area to be prefetched on the basis of the prediction accuracy for each of the bit ranges into which the block addresses are split makes it possible to predict data to be accessed in the future in addresses smaller than the block addresses before splitting. Thus, it is possible to simplify a neural network structure and save computing machine resources, compared with a case of predicting the data to be accessed in the future in block addresses before splitting. Furthermore, it is possible to reduce a learning data volume and shorten time required for learning, compared with the case of predicting the data to be accessed in the future in block address before splitting.

Moreover, in a case of splitting the block addresses into the bit ranges, there is a tendency that a random accessibility to the high-order bit-side bit ranges is reduced compared with that to the low-order bit-side bit ranges, and that access concentrates on part of the addresses among the addresses in the high-order bit-side bit ranges. Owing to this, it is possible to enhance the prediction accuracy of the addresses in the high-order bit-side bit ranges, compared with those in the low-order bit-side bit ranges. At this time, determining the addresses of the area to be prefetched on the basis of the addresses in the high-order bit-side bit ranges and determining the size of the area to be prefetched on the basis of the addresses in the low-order bit-side bit ranges make it possible to reliably prefetch data for which prefetch accuracy can be ensured while reducing an omission of prefetch of data for which the prefetch accuracy cannot be ensured. As a result, even in a case of random access from the data analysis server 1 to the storage device 2, it is possible to prefetch data highly likely to be randomly accessed without omission and to shorten access time from the data analysis server 1 to the storage device 2.

This prefetch method is effective, in particular, in a case in which the NAND flash memory 126 is randomly accessed and in a case in which a range on which access concentrates is present in a memory area of the NAND flash memory 126. In this case, using the prefetch method described above makes it possible to determine addresses and a size of the range on which access concentrates and to prefetch data in the range on which access concentrates from within the memory area of the NAND flash memory 126.

The prefetch method by the data processing apparatus of FIG. 1 will next be described in detail.

Figure 2:
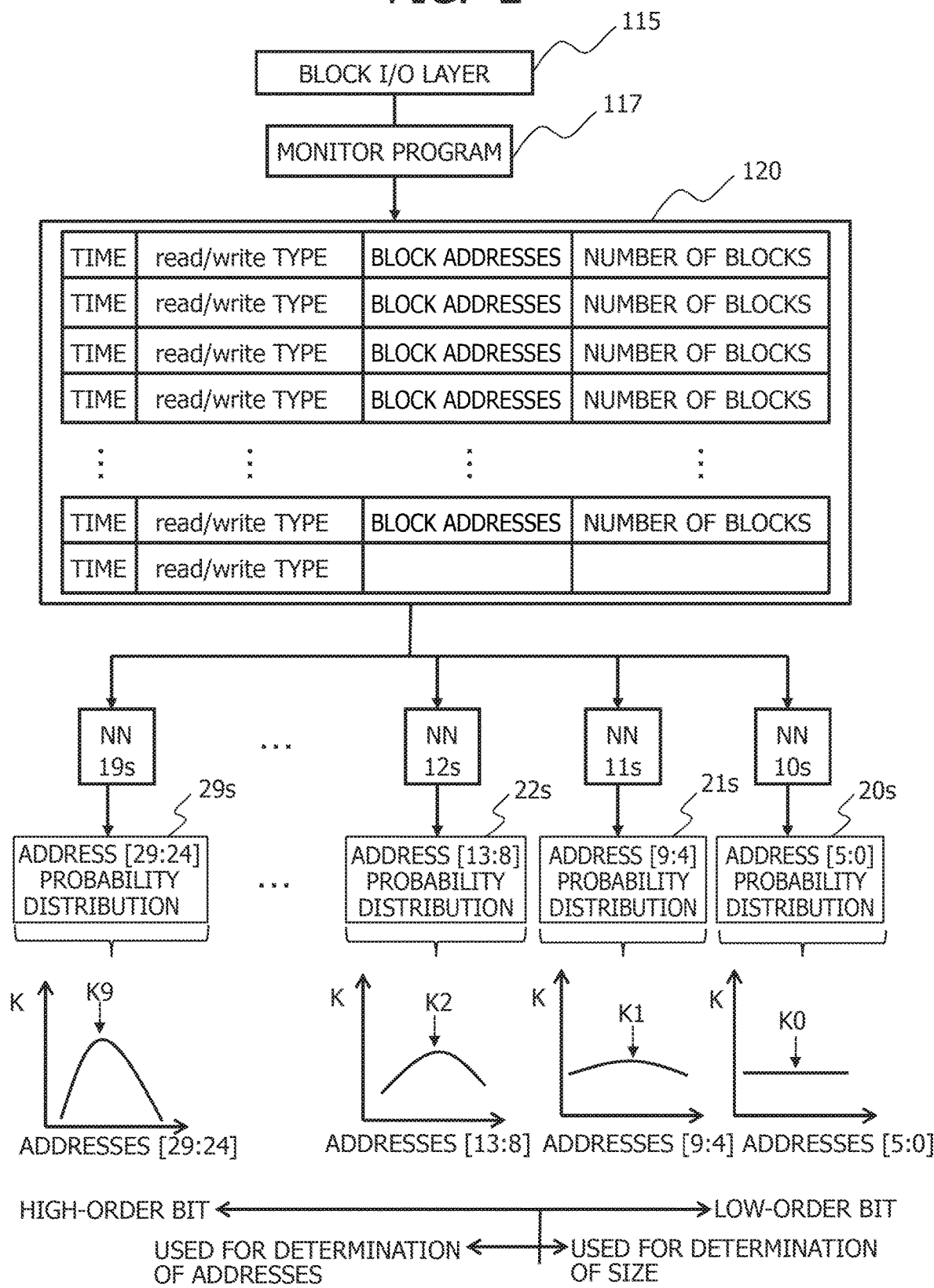
FIG. 2 is a block diagram depicting a method of generating an address probability distribution for each of bit ranges into which block addresses are split.

FIG. 2 is a block diagram depicting a method of generating an address probability distribution for each of the bit ranges into which the block addresses are split.

In FIG. 2, the data analysis server 1 acquires the I/O trace data 12 by monitoring the operation of the block I/O layer 115 via a monitor program 117. The I/O trace data 12 is processed into 4×L two-dimensional data 120 in which a constant number L of four-dimensional vectors {time, read/write type, block addresses, the number of blocks} are recorded as time series data, and input to the neural networks 10s to 19s.

If it is assumed that the number of bits of each bit range of the block addresses for which each of the neural networks 10s to 19s assumes charge of prediction is E (where E is an integer equal to or greater than 2), the bit range contains the E-th power of 2 block types of addresses and, therefore, the E-th power of 2 types of predicted values can be obtained. The predicted values mentioned herein represent predicted addresses in each bit range. For example, in a case in which the neural network 12s assumes charge of the bit range of six bits from the 13th bit to the eighth bit, the bit range contains the sixth power of 2 types of block addresses [13:8] and, therefore, the sixth power of 2 types of predicted values can be obtained. At this time, the neural network 12s outputs a probability distribution 22s of appearance of the predicted values of the block addresses [13:8]. It noted that the prediction accuracy of the predicted values of the respective block addresses [13:8] can be represented by a probability K of appearance of the predicted values of the respective block addresses [13:8].

Regularity of the probability distribution of the block addresses in each of the bit ranges tends to increase from low-order bits to the high-order bits. In this case, peak values of the probability distributions are increased from the low-order bit-side bit ranges to the high-order bit-side bit ranges. At this time, it can be determined that access concentrate on the block addresses corresponding to the peak values of the probability distributions.

It is assumed, for example, that the neural network 10s outputs a probability distribution 20s of appearance of the predicted values of the block addresses [5:0], the neural network 11s outputs a probability distribution 21s of appearance of the predicted values of the block addresses [9:4], the neural network 12s outputs the probability distribution 22s of appearance of the predicted values of the block addresses [13:8], and the neural network 19s outputs a probability distribution 29s of appearance of the predicted values of the block addresses [29:24]. If it is assumed that the peak values of the probability distributions 20s, 21s, 22s and 29s are K0, K1, K2, and K9, respectively, the peak values K0, K1, K2, and K9 have a tendency of K0<K1<K2<K9. While FIG. 2 depicts an example in which the number of peaks of the probability distributions 21s, 22s, and 29s is one, the probability distributions 21s, 22s, and 29s may have a plurality of peaks.

In this case, addresses corresponding to the peak values K2 to K9 selected from the high-order bit-side block addresses [13:8] to [29:24] can be used in determination of the prefetch addresses. Moreover, the low-order bit-side block addresses [5:0] to [9:4] can be used in determination of the prefetch size.

Figure 3:
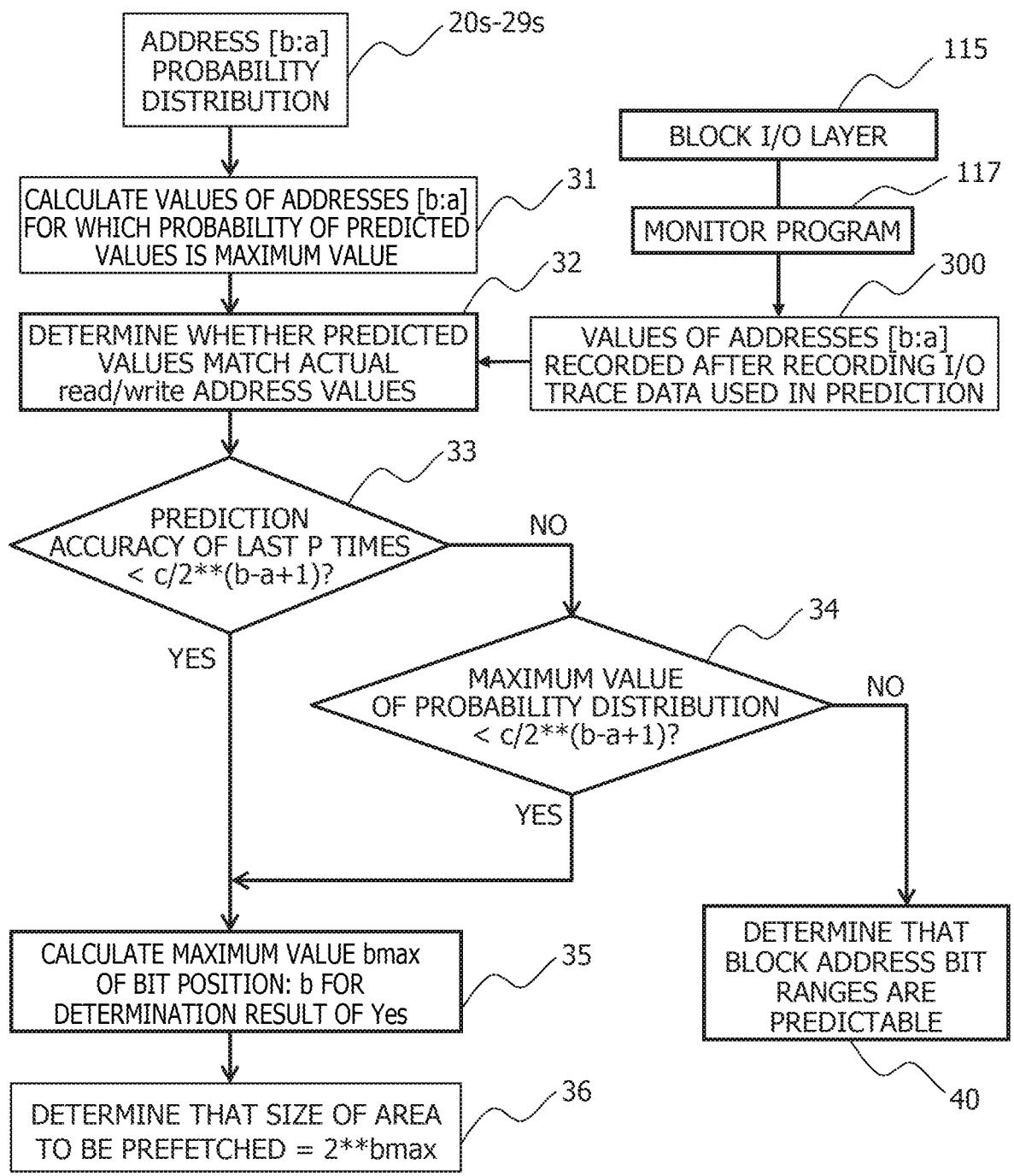
FIG. 3 depicts a procedure for determining a size of an area to be prefetched on the basis of the bit ranges into which the block addresses are split.

FIG. 3 depicts a procedure for determining the size of the area to be prefetched on the basis of the bit ranges into which the block addresses are split.

In FIG. 3, predicted values of block addresses [b:a] are calculated for each of the probability distributions 20s to 29s output as prediction results by the neural networks 10s to 19s (31). The predicted values calculated in Step 31 can be set as values of the split block addresses [b:a] for which a probability of each of the probability distributions 20s to 29s is a maximum value. It is noted that 'a' indicates a least significant bit position in each of the bit ranges into which the block addresses are split. In addition, 'b' indicates a most significant bit position in each of the bit ranges into which the block addresses are split.

Furthermore, the prediction accuracy determination section 122 acquires values 300 of block addresses [b:a] from or to which data is actually read or written and which are recorded immediately after recording the I/O trace data 12 used in prediction. The prediction accuracy determination section 122 then determines whether the predicted values based on the probability distribution acquired from each of the neural networks 10s to 19s match the values 300 of the block addresses [b:a] from or to which data is actually read or written (32).

In a case in which the block addresses [b:a] are completely random and prediction of the predicted values of the block addresses [b:a] is impossible, a probability of matching (hereinafter, referred to as "matching rate") in Step 32 is $1/((b-a+1)$-th power of 2) for the number of bits of the block addresses to be predicted=$b-a+1$. Thus, a result of the matching determination in Step 32 is recorded, and matching rates in previous P (where P is an integer equal to or greater than 2) matching determinations are compared with a constant multiple of matching rates for which prediction is impossible, that is, $c/((b-a+1)$-th power of 2) to determine a magnitude relationship (33). It is noted that 'c' is a constant. In a case in which the matching rates are lower than $c/((b-a+1)$-th power of 2), the prediction accuracy determination section 122 determines that it is difficult to predict the predicted values.

Moreover, the prediction accuracy determination section 122 compares a maximum value of the probabilities in each of the probability distributions 20s to 29s distribution with $c/((b-a+1)$-th power of 2) to determine a magnitude relationship for each of the probability distributions 20s to 29s (34). Comparing the maximum value of the probabilities with the $c/((b-a+1)$-th power of 2) to determine the magnitude relationship makes it possible to discriminate a bias of each of the probability distributions 20s to 29s. In a case in which the maximum value of the probabilities is lower than $c/((b-a+1)$-th power of 2), the prediction accuracy determination section 122 determines that the probability distribution has no bias, the block addresses [b:a] are close to randomly accessed addresses, and it is difficult to predict the predicted values.

Next, in a case of determining that it is difficult to predict the predicted values in Step 33 or 34, the prediction accuracy determination section 122 calculates a maximum value bmax of the bit position b for each of the probability distributions 20s to 29s (35). Next, the prediction accuracy determination section 122 determines that the size of the area to be prefetched is the bmax-th power of 2 (36). This process predicts the size of a certain area in the storage in a case in which the database management system 113 performs reads or writes randomly from or to the storage in the certain area for executing the query issued by the statistical analysis software 111. At this time, it is possible to prefetch all the data specified by the block addresses [b:a] for which it is determined in Step 33 or 34 that it is difficult to predict the predicted values. Owing to this, it is possible to prevent the omission of prefetch of the block addresses [b:a] for which it is determined that the prediction is difficult, and to shorten the access time to the data specified by the block addresses [b:a] for which it is determined that the prediction is difficult.

On the other hand, in a case of determining in Step 33 that the prediction accuracy is equal to or higher than $c/((b-a+1)$-th power of 2) and in a case of determining in Step 34 that the maximum value of the probabilities is equal to or higher than $c/((b-a+1)$-th power of 2), the prediction accuracy determination section 122 determines that the block addresses [b:a] are predictable (40). At this time, the predicted value determination section 123 determines the addresses of the area to be prefetched on the basis of the block addresses [b:a] determined to be predictable. It is thereby possible to limit the area to be prefetched on the basis of block addresses [b:a] determined to be predictable, and to reduce the size of a cache area.

Figure 4:
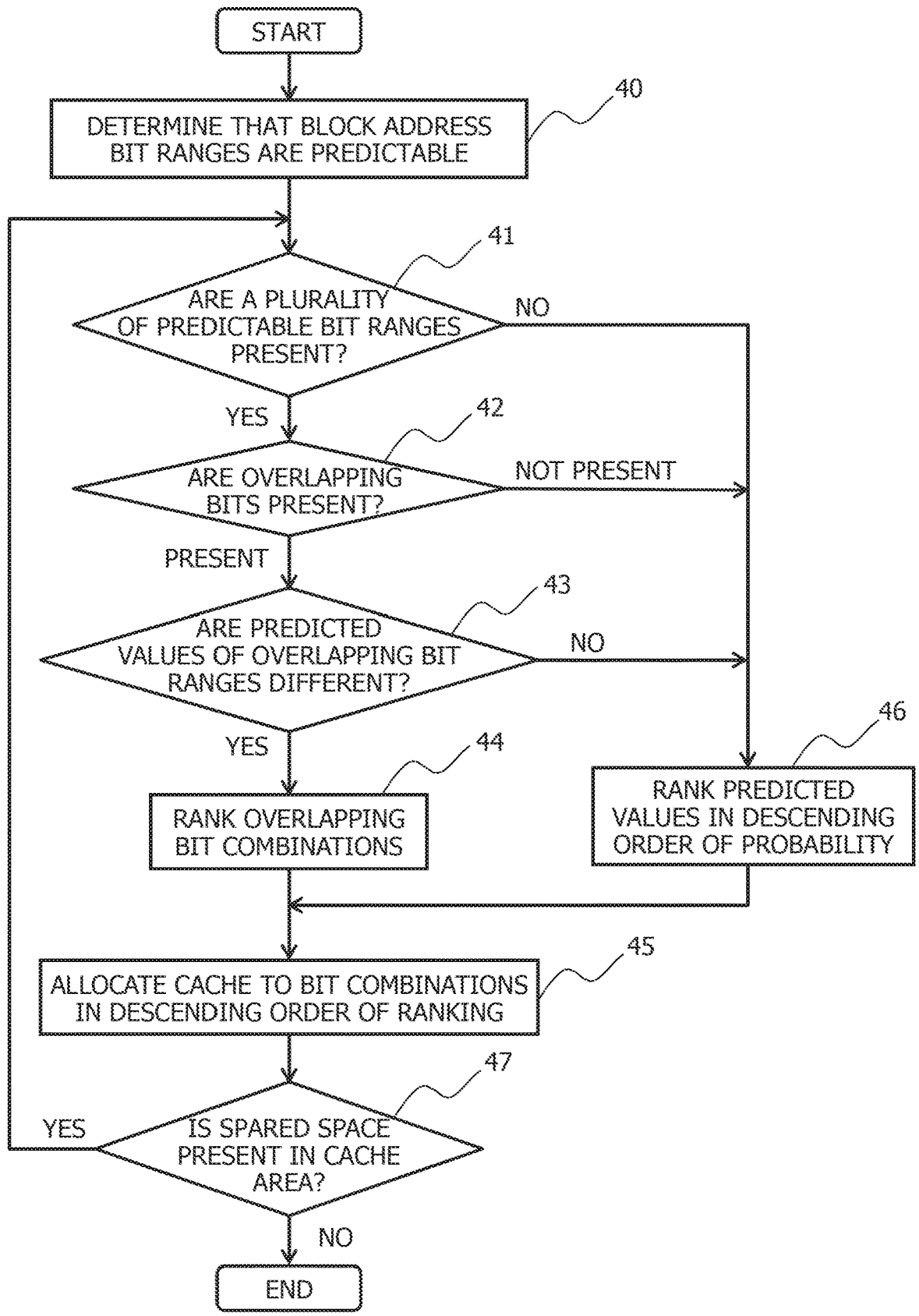
FIG. 4 depicts a procedure for determining addresses of the area to be prefetched on the basis of the bit ranges into which the block addresses are split.

FIG. 4 depicts a procedure for determining the addresses of the area to be prefetched on the basis of the bit ranges into which the block addresses are split.

In FIG. 4, it is determined whether a plurality of predictable bit ranges are present (41) after it is determined that the block addresses [b:a] are predictable in Step 40 of FIG. 3. In a case in which the plurality of predictable bit ranges are present, it is determined whether overlapping bit ranges are present (42). In a case in which the overlapping bit ranges are present, it is determined whether the predicted values match for overlapping bits (43). In a case in which the predicted values do not match, a plurality of types of combinations of predicted values are generated. At this time, the predicted values are ranked by comparing the probabilities of the predicted values to determine a magnitude relationship (44). The cache area in the storage class memory 125 is allocated to the predicted value combinations in descending order of ranking at the size determined in Step S36 of FIG. 3 (45).

In a case of determining in Step 41 that only one predictable bit range is present, the predicted values are ranked by comparing the probabilities corresponding to the predicted values to determine a magnitude relationship (46). Furthermore, in a case of determining in Step 42 that overlapping bits are not present in the plurality of predictable bit ranges, a product of probability values in each of the bit ranges is assumed as a combined probability of the predicted values and ranked.

After allocating the cache area in the storage class memory 125, it is determined whether a spare space is present in the cache area of the storage class memory 125 (47). In a case in which a spare space is present in the cache area of the storage class memory 125, then a determination is made of the bit range having the values of the probabilities of the predicted values ranking second and the predicted values, the combinations of the predicted values for the overlapping bits are ranked, and the cache area of the storage class memory 125 is allocated to the combinations of the predicted values. In a case in which a plurality of bit ranges are present as candidates ranking second, ratios of the probability values ranking first with those ranking second and the bit range closer to the predicted values ranking first is determined as the bit range ranking second.

Subsequently, the combinations of the predicted values of the overlapping bits are ranked and the cache area is allocated thereto for the bit ranges ranking third or lower and the predicted values in the bit ranges until there is no spare space in the cache area of the storage class memory 125. The storage device 2 reads data in the area to be prefetched predicted by the above method from the NAND flash memory 126 and stores the read data in the cache area of the storage class memory 125.

Figure 5:
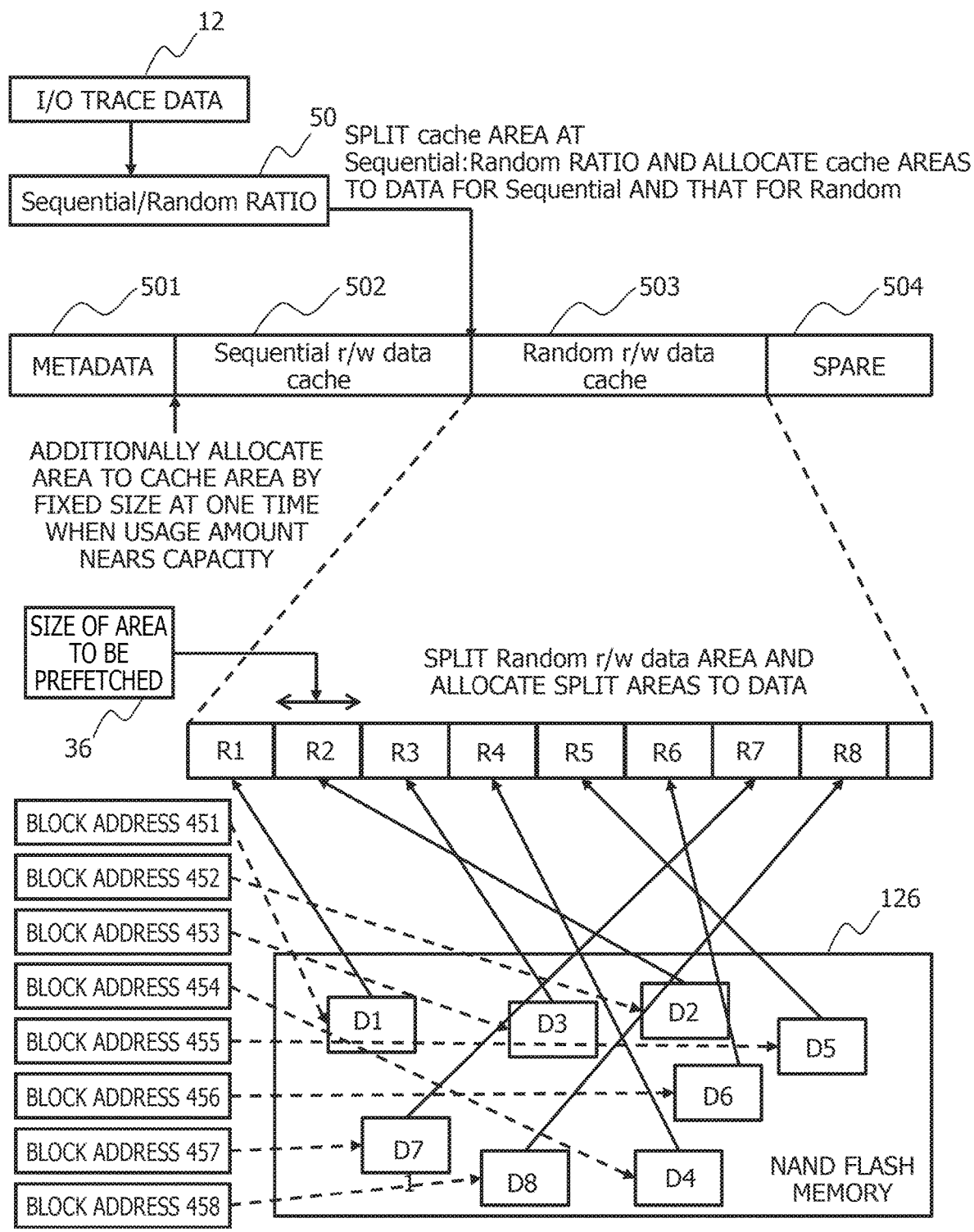
FIG. 5 is a block diagram depicting a management method of a cache memory management area in the storage class memory of FIG. 1.

FIG. 5 is a block diagram depicting a management method of a cache memory management area in the storage class memory of FIG. 1.

In FIG. 5, the storage class memory 125 is used not only as the cache memory but also as, for example, a storage area 501 of metadata managed by the storage controller 121. Furthermore, the storage class memory 125 is configured with a cache area 502 for read-aheads of continuous block address areas for sequential access and a cache area 503 for random access to perform the prefetch by the above method, in the area used as the cache memory. The storage class memory 125 is also configured with a spare area 504.

The storage controller 121 additionally allocates an area from the spare area 504 when a used amount of the metadata nears a capacity allocated to the storage class memory 125 in advance. Moreover, the storage controller 121 counts the number of blocks accessed sequentially and the number of blocks accessed randomly, and changes a capacity ratio of the cache area 502 to the cache area 503 at fixed period intervals in proportion to a ratio 50 of the count values.

The cache area 503 for the random access is split in units of the size of the area to be prefetched 36 determined by the method of FIG. 3 to generate allocation areas R1 to R8. Data D1 to D8 is sequentially read from the NAND flash memory 126 on the basis of block addresses 451 to 458 in the area to be prefetched ranked by the method of FIG. 4. The prefetch is executed by storing the data D1 to D8 in the allocation areas R1 to R8 of the cache area 503. In a case of a variation in the ranks determined by the method of FIG. 4 in response to a change in the I/O trace data 12 to be input to the neural networks 10s to 19s, the area to be prefetched falling to a rank larger than the number of splits of the cache area 503 is swapped with the area to be prefetched taking a rank equal to or smaller than the number of splits.

States of the data D1 to D8 cached in the cache area 503 are managed in blocks. Data about the block for which the data analysis server 1 issues a read request is transferred from the cache area 503 to the data analysis server 1. Data about the block for which the data analysis server 1 issues a write request is rewritten in the cache area 503, and the rewritten data in the block is written to the NAND flash memory 126 at a time of swap-out due to the variation in ranking.

The machine learning computing machine 132 of FIG. 1 causes the neural networks 10s to 19s selected on the basis of the query and the database name 11 to perform learning using the I/O trace data 12 in parallel to the prediction of the area to be prefetched. At this time, the machine learning computing machine 132 clips portions containing a fixed number of reads and writes from the I/O trace data 12, and adjusts variables of the neural networks 10s to 19s so that differences between the predicted values and the actual address values can be reduced for the bit ranges into which the block addresses are split from and to which reads and writes are performed subsequently.

Figure 6:
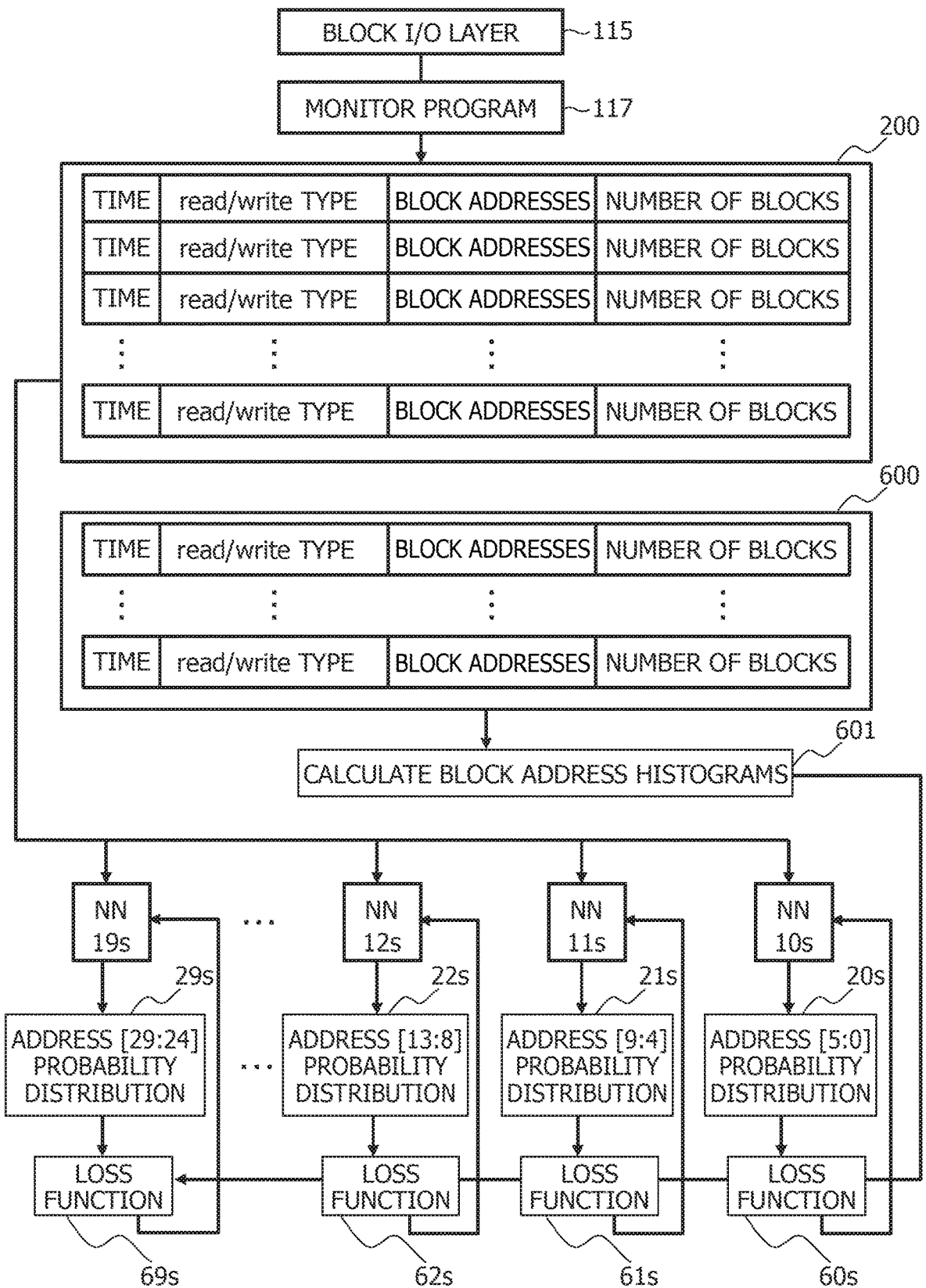
FIG. 6 is a block diagram depicting a learning method by neural networks for predicting the address probability distribution for each of the bit ranges into which the block addresses are split.

FIG. 6 is a block diagram depicting a learning method of the neural networks predicting the address probability distributions for the bit ranges into which the block addresses are split.

In FIG. 6, the I/O trace data 12 is processed into 4×L two-dimensional data 200 and 4×N two-dimensional data 600 in which constant numbers L and N of four-dimensional vectors {time, block addresses, the number of blocks, read/write type} are recorded as time series data. The 4×L two-dimensional data 200 is input to the neural networks 10s to 19s similarly to the case of FIG. 2, and the neural networks 10s to 19s output the probability distributions 20s to 29s of appearance of the predicted values in the bit ranges into which the block addresses are split, respectively.

On the other hand, histograms of the bit ranges into which the block addresses are split are calculated for the 4×M two-dimensional data 600 (601). The histograms can represent appearance frequencies of the addresses in the bit ranges. The histograms can be used as access patterns of access actually occurring to the probability distributions 20s to 29s predicted from previous access patterns. Prediction errors in the probability distributions 20s to 29s for the actually occurring access patterns are calculated and set as loss functions 60s to 69s. The neural networks 10s to 19s are trained by adjusting the variables of the neural networks 10s to 19s so that values of the loss functions 60s to 69s can be reduced.

Figure 7:
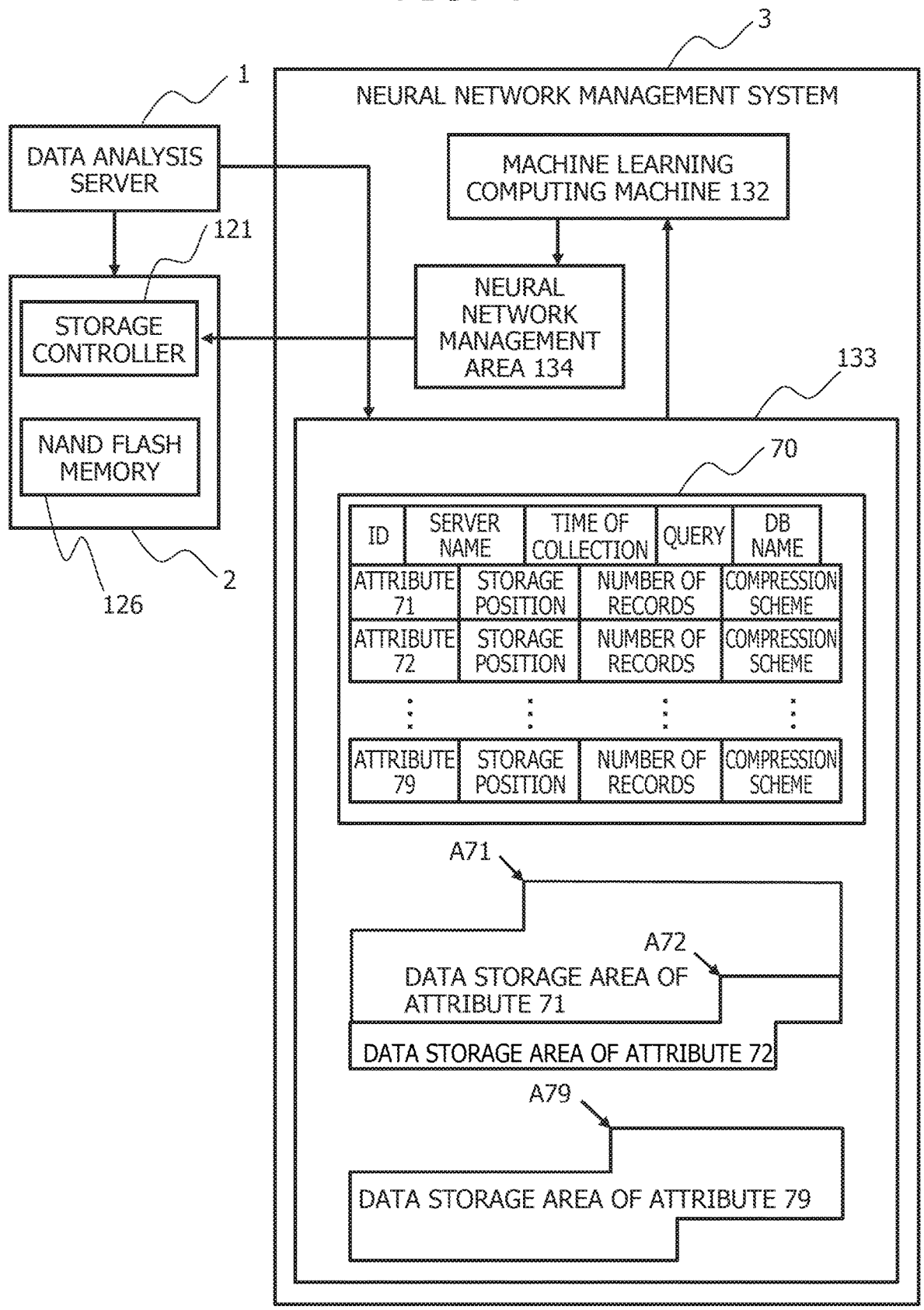
FIG. 7 is a block diagram depicting an example of I/O trace data in a column store storage format that can be used in learning by the neural networks of FIG. 1.

FIG. 7 is a block diagram depicting an example of I/O trace data in a column store storage format that can be used in learning by the neural networks of FIG. 1.

In FIG. 7, the neural network management system 3 defines an ID with which the data analysis server 1 can uniquely identify the I/O trace data 12, a data analysis server name, time of collecting the I/O trace data 12, and the query and database name 11 as metadata 70, and associates the metadata 70 with the I/O trace data 12. The neural network management system 3 then accumulates pieces of I/O trace data storage 12 associated with the metadata 70 in the I/O trace data storage 133.

Many records that are the four-dimensional vectors {time, read/write type, block addresses, the number of blocks} are stored in the I/O trace data 12 in the present embodiment as the time series data. At this time, it is possible to adopt a column store storage format for storing pieces of the I/O trace data 12 of the same attribute in continuous areas and separately managing information such as an attribute name, a storage position, the number of records, and a compression scheme as part of the metadata 70. For example, pieces of the I/O trace data 12 of an attribute 71 are stored in continuous areas indicated by a storage position A71, pieces of the I/O trace data 12 of an attribute 72 are stored in continuous areas indicated by a storage position A72, and pieces of the I/O trace data 12 of an attribute 79 are stored in continuous areas indicated by a storage position A79. It is thereby possible to efficiently read the I/O trace data 12 used in the machine learning normally handled as multi-dimensional tensors.

For example, the data about the read/write type takes on only two types of values and the read/write types often continuously take on the same value. For this reason, adopting the column store storage format makes it possible to improve a compression ratio of run-length compression for performing compression by recording the number of pieces of data appearing continuously and to increase the number of records that can be acquired by a read of a fixed amount. Moreover, adopting the column store storage format makes it possible to record not only the four types of data described above but also data such as a process name for input/output and to select the I/O trace data 12 used in the machine learning of only part of the attributes. In that case, data about attributes not used in the learning is contained in the records; thus, the column store format for storing the I/O trace data 12 in the continuous areas per attribute can ensure higher read efficiency than a case of storing records in the continuous areas.

The neural networks 10s to 19s selected on the basis of the query and database name 11 from the neural network management area 134 are trained asynchronously with the prediction of the area to be prefetched. In this case, N (where N is a positive integer) sets of 4×(L+M) two-dimensional series data are selected at random from the accumulated I/O trace data 12 and the neural networks are trained using 4×(L+N)×N three-dimensional data.

Figure 8:
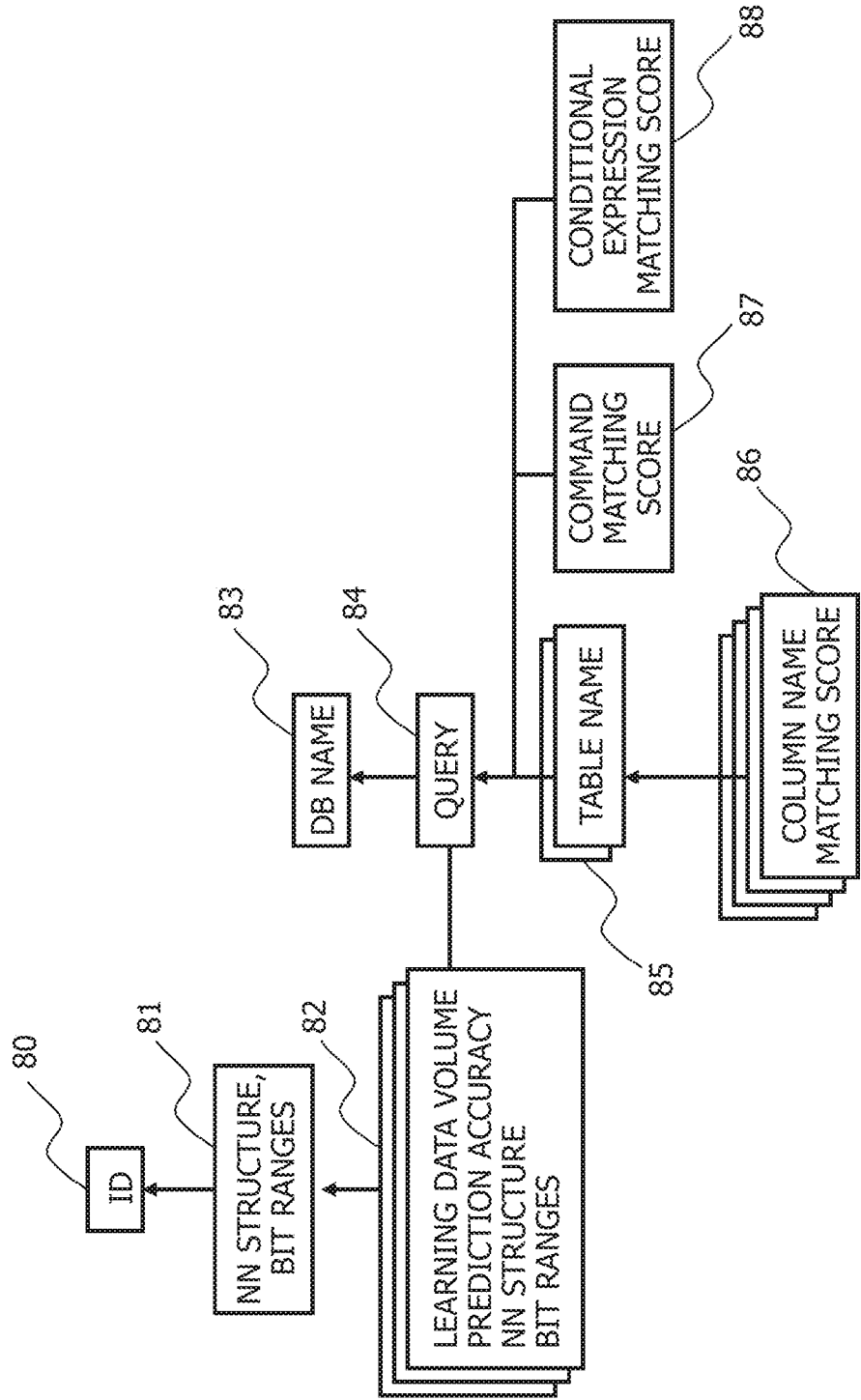
FIG. 8 depicts a data structure indicating attributes of neural networks used in selection based on queries and database names.

FIG. 8 depicts a data structure indicating attributes of the neural networks used in selection based on the query and database name. In FIG. 8, unique IDs 80 are assigned to the neural networks 10a to 19a, 10b to 19b, . . . , and 10z to 19z of FIG. 1, respectively. The neural network management system 3 manages not only data 81 defining each neural network, that is, a type, a structure and a variable value, and the bit range of the block addresses for which each neural network takes charge of prediction, but also a learning data volume and prediction accuracy 82 as the attribute information about the neural networks 10a to 19a, 10b to 19b, . . . , and 10z to 19z.

Furthermore, each of the neural networks 10a to 19a, 10b to 19b, . . . , and 10z to 19z is associated with the database name 83 and a query 84. The neural network management system 3 manages information about a column name 86 of a table 85 accessed at the time of executing the query 84, a command 87, and a conditional expression 88.

A matching score value for calculating a query similarity can be added to the information about the query 84. For example, it can be calculated that a query similarity=0 if the database names 83 do not match, and that the query similarity={(total of column name matching score values)+(command matching score value)+(conditional expression matching score value)} if the database names 83 match.

The query similarity can be used in detecting similar queries similar to the query 84. In a case in which there are no neural networks 10a to 19a, 10b to 19b, . . . , and 10z to 19z associated with the query received by the DB client 112, the neural networks 10a to 19a, 10b to 19b, . . . , or 10z to 19z associated with the similar queries similar to the query can be selected.

FIG. 9 depicts an example of an NN management screen for managing the neural networks of FIG. 1.

In FIG. 9, the ID 80, the database name 83, the query 84, and learning data volume and prediction accuracy 82 of FIG. 8 are displayed for each neural network on the NN management screen 89. In addition, similar queries, query similarity, performance, and operation are displayed on the NN management screen 89.

The performance can indicate how the prediction accuracy is improved by training the neural network. The operation can include an operation for turning off the prefetch function based on the prediction and performing only training, an operation for prohibiting the use of the neural network for which the prediction accuracy is not improved as a result of the training, an operation for changing the score values used to calculate the query similarity, and the like.

An administrator of the storage device 2 can perform various operations through the NN management screen 89 while referring to prediction accuracy and training history information. The training history information can contain information as to which data out of the learning data volume, the performance, and the accumulated I/O trace data 12 is used in learning. The training history information may be held as part of the metadata 70 in the column store storage format of FIG. 7.

Second Embodiment

Figure 10:
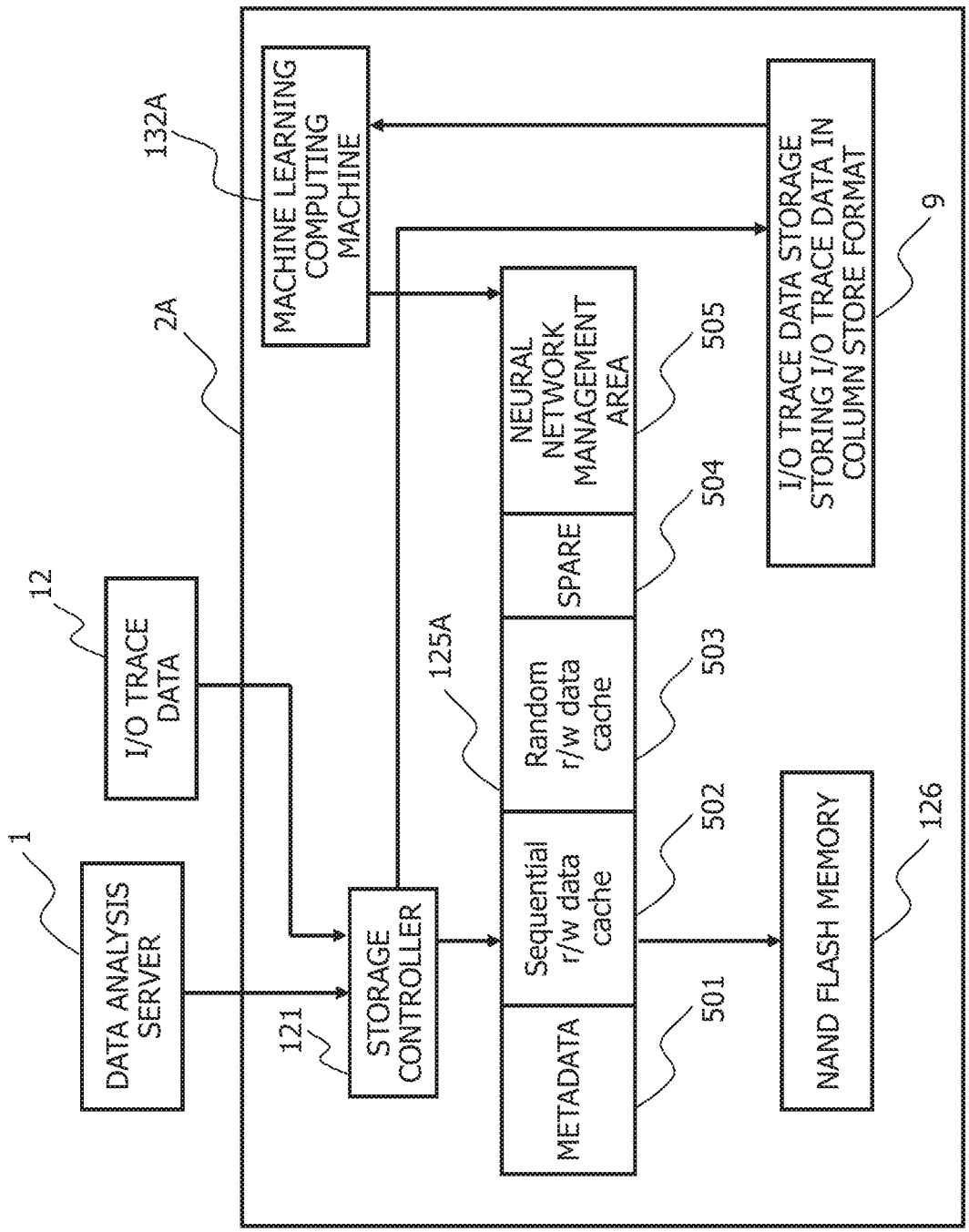
FIG. 10 is a block diagram depicting a configuration of a data processing apparatus according to a second embodiment.

FIG. 10 is a block diagram depicting a configuration of a data processing apparatus according to a second embodiment.

The data processing apparatus of FIG. 10 is configured with a storage device 2A as an alternative to the storage device 2 and the neural network management system 3 of FIG. 1. The storage device 2 is configured with a machine learning computing machine 132A and an I/O trace data storage 9 additionally to the configuration of the storage device 2 of FIG. 1. The I/O trace data storage 9 stores the I/O trace data 12 in the column store format of FIG. 7. A storage class memory 125A in the storage device 2A is configured with a neural network management area 505 additionally to the storage area 501, the cache areas 502 and 503, and the spare area 504 of FIG. 5. The neural network management area 505 can be configured similarly to the neural network management area 134 of FIG. 1.

The I/O trace data 12 that is learning data is collected by the storage controller 121 and stored in the I/O trace data storage 9 in the column store format. Data such as the variables and the attributes for defining each of the neural networks managed in the neural network management area 505 is stored together with the metadata 501 and the like in the storage class memory 125.

The machine learning computing machine 132A executes training of the neural networks under management using unlearned I/O trace data 12, and updates variable values defining the neural networks stored in the neural network management area 505.

Providing the neural network management area 505 in the storage class memory 125 makes it unnecessary to provide the neural network management system 3 separately from the storage device 2 of FIG. 1 and makes it possible to simplify a system configuration.

Third Embodiment

Figure 11:
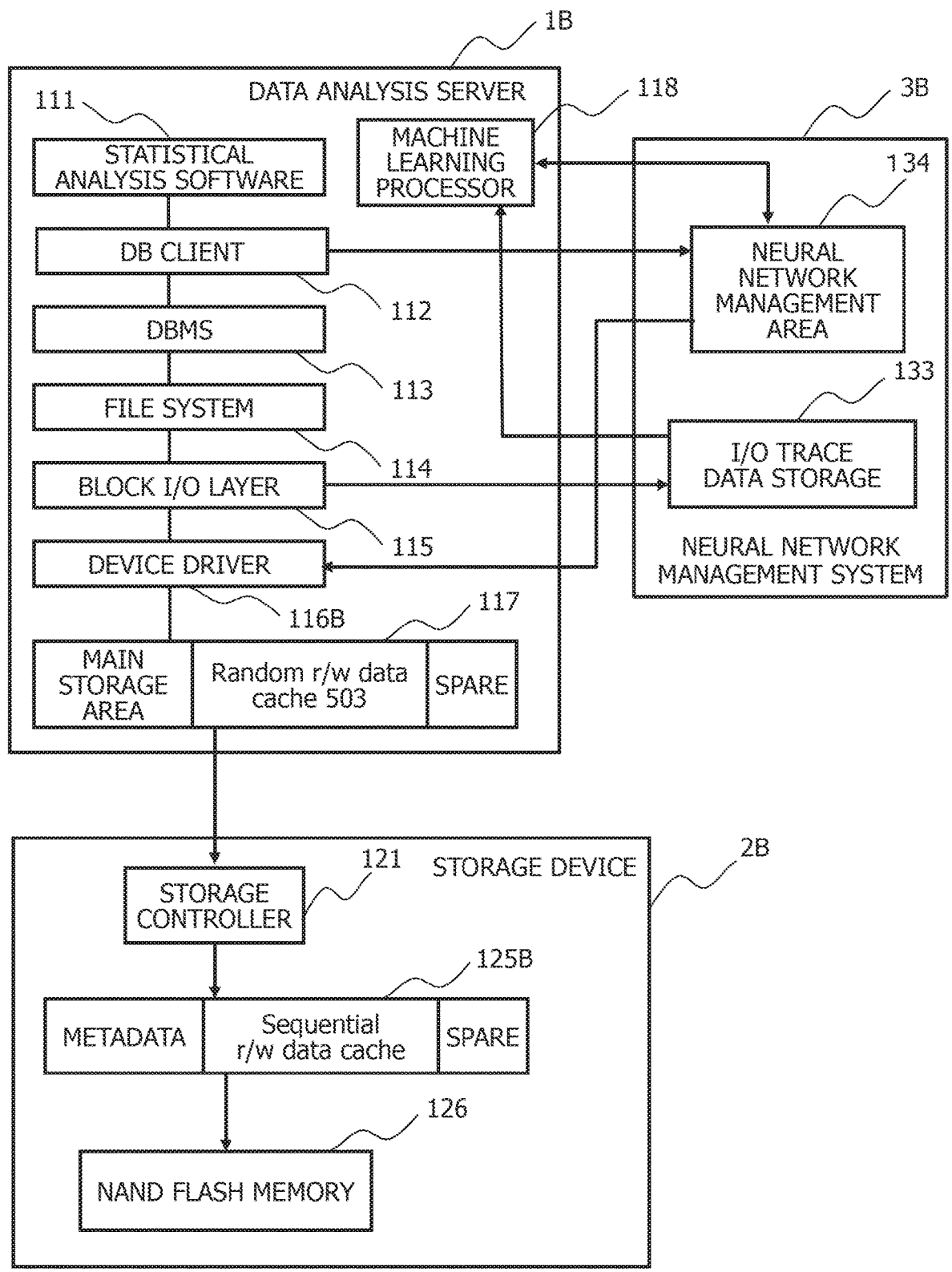
FIG. 11 is a block diagram depicting a configuration of a data processing apparatus according to a third embodiment.

FIG. 11 is a block diagram depicting a configuration of a data processing apparatus according to a third embodiment.

The data processing apparatus of FIG. 11 is configured with a data analysis server 1B, a storage device 2B, and a neural network management system 3B.

The data analysis server 1B is configured with the statistical analysis software 111, the DB client 112, the database management system 113, the file system 114, the block I/O layer 115, a device driver 116B, a storage class memory 117, and a machine learning processor 118.

The device driver 116B is configured with the prediction accuracy determination section 122, the predicted value determination section 123, the prefetch issuance section 124, and the prediction model 127 of FIG. 1. The storage class memory 117 is configured with the cache area 503 of FIG. 5. The storage class memory 117 may be also configured with a main storage area and a spare area in addition to the cache area 503. The machine learning processor 118 causes the neural networks 10a to 19a, 10b to 19b, . . . , or 10z to 19z to learn the I/O trace data 12 accompanying the execution of the query for each of the bit ranges.

The storage device 2B is configured with the storage controller 121, a storage class memory 125B, and the NAND flash memory 126. The storage class memory 125B is configured with the storage area 501, the cache area 502, and the spare area 504 of FIG. 5.

The neural network management system 3B is configured with the I/O trace data storage 133 and the neural network management area 134.

The device driver 116 prefetches data from the storage device 2B on the basis of the prediction by the neural networks. The I/O trace data 12 that is the learning data collected by monitoring the operation of the block I/O layer 115 is stored in the I/O trace data storage 133 in the neural network management system 3B. The neural networks using the I/O trace data 12 is trained using the I/O trace data 12 during spare time of the machine learning processor 118.

Providing the cache area 503 for random access for performing prefetch in the data analysis server 1B makes it unnecessary to access the storage device 2B when the statistical analysis software 111 utilizes the prefetched data, and makes it possible to accelerate access to the prefetched data.

Fourth Embodiment

The ratio of the sequential access to the random access is high depending on the database management system. For the database management system having the ratio of the sequential access to the random access higher than a fixed value, the number of blocks accessed at continuous addresses using the neural networks to which the I/O trace data 12 is input is predicted, and data is prefetched in the cache area 502 for the sequential access. It is thereby possible to prefetch overall data accessed at the continuous addresses and to shorten the access time to the data accessed at the continuous addresses.

Fifth Embodiment

The ratio of the number of blocks read randomly to the number of blocks written randomly is calculated from the previous I/O trace data. Furthermore, the cache area 503 for the random access is split into an area for read access and an area for write access on the basis of the ratio of the number of blocks read randomly to the number of blocks written randomly. The neural networks for recognizing patterns of the block addresses read randomly and the neural networks for recognizing patterns of the block addresses written randomly are trained separately, and data is prefetched in the cache areas on the basis of block address predictions, respectively. It is thereby possible to allocate the cache area in response to read and write data volumes and to make effective use of the cache area.

Sixth Embodiment

Figure 12:
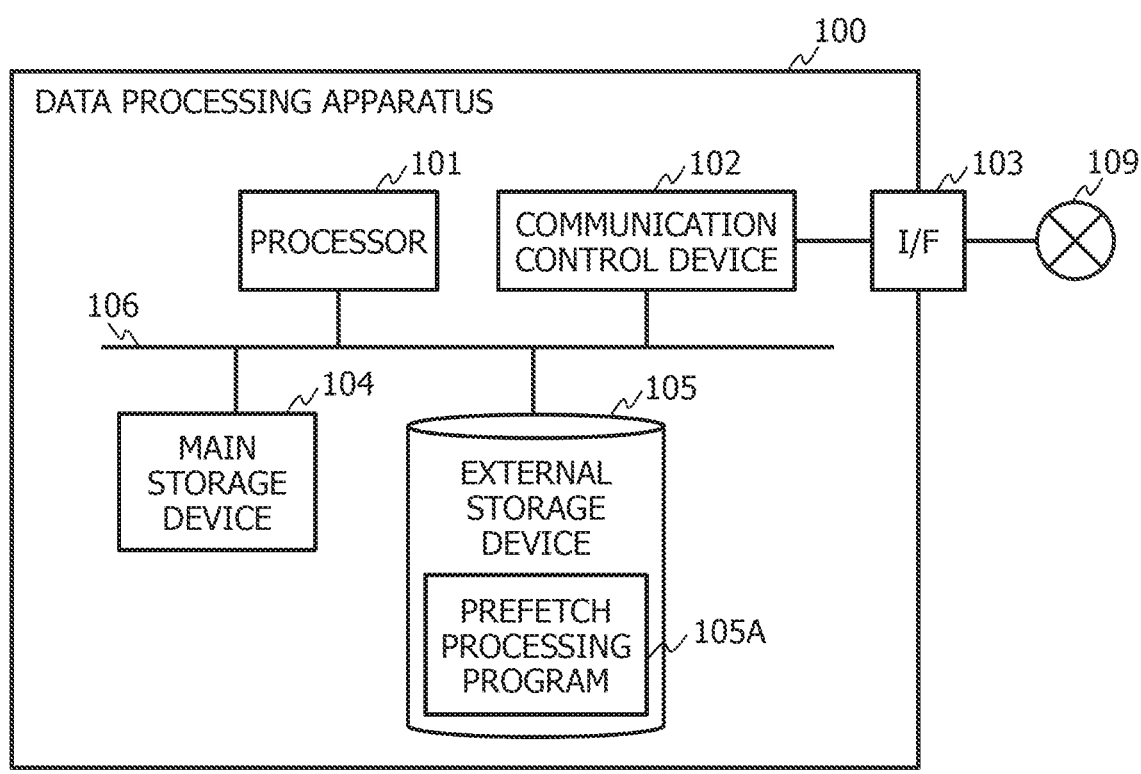
FIG. 12 is a block diagram depicting an example of a hardware configuration of the data processing apparatus of FIG. 1.

FIG. 12 is a block diagram depicting an example of a hardware configuration of the data processing apparatus of FIG. 1.

In FIG. 12, a data processing apparatus 100 is configured with a processor 101, a communication control device 102, a communication interface 103, a main storage device 104, and an external storage device 105. The processor 101, the communication control device 102, the communication interface 103, the main storage device 104, and the external storage device 105 are mutually connected via an internal bus 106. The main storage device 104 and the external storage device 105 are accessible from the processor 101.

The processor 101 is hardware that exercises control over operations of the overall data processing apparatus 100. The main storage device 104 can be configured with, for example, a semiconductor memory such as an SRAM or a DRAM. A program that is being executed by the processor 101 can be stored in the main storage device 104, and a work area where the processor 101 executes the program can be provided in the main storage device 104.

The external storage device 105 is a storage device that has a mass-storage capacity. The external storage device 105 is configured with a storage class memory and a NAND flash memory. The external storage device 105 can retain data used in executing execution files for various programs and executing the programs. A prefetch processing program 105A can be stored in the external storage device 105. The prefetch processing program 105A may be software installable into the data processing apparatus 100 or may be incorporated into the data processing apparatus 100 as firmware.

The communication control device 102 is hardware having a function to control communication with outside. The communication control device 102 is connected to a network 109 via a communication interface 103. The network 109 may be a WAN (Wide Area Network) such as the Internet, a LAN (local area network) such as Wi-Fi, or a mixture of the WAN and the LAN.

The processor 101 reads the prefetch processing program 105A to the main storage device 104 and executes the prefetch processing program 105A, whereby it is possible to split block addresses into a plurality of bit ranges on the basis of bit positions, to determine the prediction accuracy of the addresses used in the prefetch for each of the bit ranges, and to determine the area to be prefetched on the basis of prediction accuracy determined for each of the bit ranges.

At this time, the prefetch processing program 105A can realize functions of the prediction accuracy determination section 122, the predicted value determination section 123, the prefetch issuance section 124, and the prediction model 127 of FIG. 1. It is noted that the execution of the prefetch processing program 105A may be shared among a plurality of processors or computers. Alternatively, the processor 101 may instruct a cloud computer or the like to execute entirety or part of the prefetch processing program 105A via the network 109 and receive an execution result.

While the embodiments of the present invention have been described so far, the present invention is not limited to the embodiments described above but encompasses various modifications and equivalent configurations within the meaning of the accompanying claims. For example, the embodiments have been described in detail for describing the present invention so that the present invention is easy to understand, and the present invention is not always limited to the embodiments having all the described configurations.

For example, while the method of using the neural networks 10s to 19s having learned the I/O trace data for the prediction of the probability distributions 20s to 29s of FIG. 2 has been described in the embodiments, the neural networks 10s to 19s are not always used. For example, the probability distributions 20s to 29s of FIG. 2 may be predicted on the basis of an algorithm for calculating the probability distributions 20s to 29s of FIG. 2 on the basis of the I/O trace data. Furthermore, while the case of using the storage class memory 125 as the cache has been described in the embodiments, the present invention may be applied to a case of using the DRAM or the SRAM as the cache.

What is claimed is:

1. A data processing apparatus, wherein
the data processing apparatus splits block addresses into a plurality of bit ranges on the basis of bit positions;
the data processing apparatus determines prediction accuracy of addresses used in prefetch for each of the bit ranges;
the data processing apparatus determines an area to be prefetched on the basis of the prediction accuracy determined for each of the bit ranges;
the data processing apparatus determines a size of the area to be prefetched on the basis of addresses in the bit range for which the prediction accuracy is lower than a predetermined value; and
the data processing apparatus determines addresses of the area to be prefetched on the basis of addresses in the bit range for which the prediction accuracy is equal to or higher than the predetermined value.

2. The data processing apparatus according to claim 1, wherein
the bit range used in determining the size of the area to be prefetched is closer to a low-order bit than the bit range used in determining the addresses of the area to be prefetched.

3. The data processing apparatus according to claim 2, wherein the predetermined value is defined by formula 1:

$$C/2(b-a+1) \qquad \text{Formula 1}$$

a is a least significant bit position in each of the bit ranges that the block addresses are split,
b is a most significant bit position in each of the bit ranges that the block addresses are split, and
c is a constant.

4. The data processing apparatus according to claim 1, wherein
the data processing apparatus uses a plurality of prediction models using I/O trace data in which block addresses used in previous reads or writes are recorded and which assume charge of the different bit ranges, and predict the addresses of the area to be prefetched for each of the bit ranges.

5. The data processing apparatus according to claim 4, wherein
the data processing apparatus manages a plurality of neural networks each associated with a query and a database name,
the data processing apparatus selects neural networks on the basis of the query, and
the selected neural networks learn the I/O trace data accompanying execution of the query, and predict the addresses of the area to be prefetched.

6. The data processing apparatus according to claim 5, wherein
the data processing apparatus manages training history information and prediction accuracy information about the neural networks corresponding to the bit ranges of the block addresses, the query, and the database name, and the data processing apparatus operates application of the prefetch on the basis of learning by the neural networks and the prediction of the block addresses.

7. The data processing apparatus according to claim 4, wherein
the data processing apparatus allocates cache areas to sequential access and random access on the basis of a ratio of the sequential access to the random access, and
the data processing apparatus predicts the addresses of the areas to be prefetched for each of the bit ranges with respect to the cache for the random access.

8. The data processing apparatus according to claim 7, wherein
the data processing apparatus allocates cache areas to random reads and random writes on the basis of a ratio of the random reads to the random writes, and
the data processing apparatus uses neural networks separately learned by the reads and the writes, and predicts the addresses of the area to be prefetched for each of the bit ranges.

9. The data processing apparatus according to claim 1, wherein
in a case in which a ratio of sequential access to random access is high, the data processing apparatus uses the prediction models using I/O trace data in which block addresses used in previous reads or writes are recorded, predicts the number of blocks accessed at continuous addresses, and prefetches data accessed at the continuous addresses.

10. The data processing apparatus according to claim 1, wherein
the data processing apparatus calculates a maximum value of each of the bit positions; and
the data processing apparatus determines a size of the area to be perfected is equal to two to the power of the maximum value of each of the bit positions.

11. A prefetch method,
wherein a data processing apparatus includes a processor executing a prefetch processing program, the prefetch method comprising,
by executing the prefetch processing program by the processor,
splitting block addresses into a plurality of bit ranges on the basis of bit positions,
determining an area to be prefetched on the basis of a probability of matching of addresses in the bit ranges used in prefetch with addresses in the bit ranges used in reads or writes after the prefetch,
determining a size of the area to be prefetched on the basis of addresses in the bit range for which the probability is lower than a predetermined value, and
determining addresses of the area to be prefetched on the basis of the addresses in the bit range for which the probability is equal to or higher than the predetermined value.

12. The prefetch method according to claim 11, wherein
the bit range used in determining the size of the area to be prefetched is closer to a low-order bit than the bit range used in determining the addresses of the area to be prefetched.

* * * * *